(12) United States Patent
Ochi et al.

(10) Patent No.: US 11,203,159 B2
(45) Date of Patent: Dec. 21, 2021

(54) THREE-DIMENSIONAL OBJECT PRODUCTION METHOD AND THREE-DIMENSIONAL OBJECT PRODUCTION DEVICE

(71) Applicant: MIMAKI ENGINEERING CO., LTD., Nagano (JP)

(72) Inventors: Kazuhiro Ochi, Nagano (JP); Masakatsu Okawa, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 575 days.

(21) Appl. No.: 16/060,026

(22) PCT Filed: Dec. 8, 2016

(86) PCT No.: PCT/JP2016/086491
§ 371 (c)(1),
(2) Date: Jun. 7, 2018

(87) PCT Pub. No.: WO2017/099162
PCT Pub. Date: Jun. 15, 2017

(65) Prior Publication Data
US 2018/0361672 A1 Dec. 20, 2018

(30) Foreign Application Priority Data
Dec. 11, 2015 (JP) .............................. JP2015-242706

(51) Int. Cl.
| | |
|---|---|
| B29C 64/393 | (2017.01) |
| B33Y 10/00 | (2015.01) |
| B33Y 30/00 | (2015.01) |
| B33Y 50/02 | (2015.01) |
| B29C 64/112 | (2017.01) |
| B29C 64/165 | (2017.01) |

(Continued)

(52) U.S. Cl.
CPC .......... *B29C 64/393* (2017.08); *B29C 64/112* (2017.08); *B29C 64/165* (2017.08); *B29C 64/209* (2017.08); *B33Y 10/00* (2014.12); *B33Y 30/00* (2014.12); *B33Y 50/02* (2014.12); *B41J 2/2139* (2013.01); *B41J 2/2142* (2013.01)

(58) Field of Classification Search
CPC .................................................. B29C 64/393
See application file for complete search history.

(56) References Cited

U.S. PATENT DOCUMENTS

2007/0024667 A1  2/2007  Kim

FOREIGN PATENT DOCUMENTS

| | | |
|---|---|---|
| JP | 2003181941 | 7/2003 |
| JP | 2012071611 | 4/2012 |
| JP | 2015221576 | 12/2015 |

OTHER PUBLICATIONS

Office Action of Japan Counterpart Application, with English translation thereof, dated Nov. 13, 2018, pp. 1-7.

(Continued)

*Primary Examiner* — Larry W Thrower
(74) *Attorney, Agent, or Firm* — JCIPRNET

(57) ABSTRACT

A three-dimensional object production method according to the disclosure includes a step of allocating one of regions in a nozzle row (22) that is different from each other to each of pixel groups (25A, 25B) divided into a predetermined number n (n being an integer ≥2) of groups among pixel rows constituting the unit layer (25), and a step of forming the pixel rows by nozzles (21) included in each region forming one pixel group (25A, 25B).

4 Claims, 10 Drawing Sheets

(51) Int. Cl.
*B41J 2/21* (2006.01)
*B29C 64/209* (2017.01)

(56) References Cited

OTHER PUBLICATIONS

"Search Report of Europe Counterpart Application", dated Nov. 22, 2018, p. 1-p. 7.
"International Search Report (Form PCT/ISA/210) of PCT/JP2016/086491", dated Feb. 21, 2017, with English translation thereof, pp. 1-3.

THREE-DIMENSIONAL OBJECT PRODUCTION METHOD AND THREE-DIMENSIONAL OBJECT PRODUCTION DEVICE

CROSS-REFERENCE TO RELATED APPLICATION

This application is a 371 application of the International PCT application serial no. PCT/JP2016/086491, filed on Dec. 8, 2016, which claims the priority benefits of Japan Patent Application No. 2015-242706, filed on Dec. 11, 2015. The entirety of each of the above-mentioned patent applications is hereby incorporated by reference herein and made a part of this specification.

TECHNICAL FIELD

The disclosure relates to a three-dimensional object production method and a three-dimensional object production apparatus for shaping a three-dimensional object formed by laminating unit layers.

BACKGROUND ART

As techniques for producing a three-dimensional shaped object, an inkjet method, a sheet laminating method, a fused substance deposition method (FDM: Fused Deposition Molding), an inkjet binder method, a photolithography method (SL: Stereo Lithography), and a powder sintering method (SLS: Selective Laser Sintering), and the like are known.

Amongst them, as the inkjet method, a method that laminates layers produced by ejecting a modeling material that cures by receiving light irradiation is widely used. With this method, firstly outer and inner designs and structures of a three-dimensional shaped object which is desired to be obtained as a final resultant is digitized by 3D-CAD (: Computer-Aided Design), and then multilayer pattern data obtained by slicing the aforementioned data by certain intervals is created. Then, the modeling material is ejected according to the pattern data of each layer to laminate the respective layers and produce the three-dimensional shaped object.

In the above, a part of droplets ejected from respective nozzles of an inkjet head floats in air in a form of mist. Further, when this floating mist adheres to a nozzle surface, it turns into contaminant on the nozzle surface which causes droplet ejection failure or missing nozzle. Further, in a case where a frequency of ejection of the droplets to be ejected from respective nozzles is low, or when thickening occurs on the nozzle surface or in the nozzles by viscosity of the droplets themselves, missing nozzle may be caused. Thus, Patent Document 1 describes a technique for preventing droplet ejection failure or missing nozzle. Specifically, according to the technique described in Patent Document 1, a head is displaced irregularly so that portions with the missing nozzle do not overlap in a laminating direction.

CITATION LIST

Patent Literature

Patent Literature 1: Japanese Unexamined Patent Publication No. 2012-71611

SUMMARY OF DISCLOSURE

Technical Problems

However, although the technique disclosed in Patent Document 1 sees the portions with the missing nozzle being overlapped in the laminating direction of unit layers as being problematic, in a case of performing multi-pass printing while the head moves in a main scanning direction, the portions with the missing nozzle align sequentially along the main scanning direction, so that a groove is thereby formed in the unit layers in the main scanning direction.

The disclosure is made in view of the above problem, and an aim thereof is to provide a three-dimensional object production method and a three-dimensional object production apparatus which can satisfactorily form unit layers despite an occurrence of droplet ejection failure or missing nozzle.

Solutions to the Problems

To solve the above problem, a three-dimensional object production method according to an embodiment of the disclosure is a three-dimensional object production method that shapes a three-dimensional object by laminating unit layers formed by ejecting droplets from a head, the head including a nozzle row in which a plurality of nozzles are aligned along a sub scanning direction which intersects perpendicularly to a main scanning direction of the head, the nozzle row being divided into a predetermined number n (n being an integer ≥2) of regions in the sub scanning direction, the three-dimensional object production method including: an allocating step of allocating one of the regions in the nozzle row that is different from each other to each of pixel groups, each of which is configured of pixels divided into groups of the predetermined number n in pixel rows constituting one of the unit layers and located at a predetermined interval in the main scanning direction; and a forming step of forming the pixel rows by the nozzles in each of the regions forming one of the pixel groups.

According to the above method, one pass constitutes one pixel group, and one unit layer is completed by using all passes. Especially in the above method, the pixels located at the predetermined interval are formed by one pass. Due to this, pixels formed by one nozzle are not arranged sequentially in the main scanning direction, and are dispersed in the main scanning direction. Thus, even if droplet ejection failure or missing nozzle occurs, a groove can be prevented from being formed in the unit layers in the main scanning direction due to pixels formed by a nozzle in which the droplet ejection failure or missing nozzle is occurring being arranged sequentially in the main scanning direction. As above, in the three-dimensional object production method according to an embodiment of the disclosure, the unit layers can be formed satisfactorily despite the occurrence of the droplet ejection failure or missing nozzle.

Here, in normal multi-pass printing, shaping time is doubled if a pass number is doubled. However, in the three-dimensional object production method according to an embodiment of the disclosure, since one pixel group is formed at equal intervals by one pass and one unit layer is completed by using all the passes, a scan resolution of the head can be reduced, so that a scan speed per one pass becomes faster as compared to the normal multi-pass printing. Thus, in the three-dimensional object production method according to an embodiment of the disclosure, since the scan speed per one pass is doubled even when the pass number is doubled, its shaping time can be made equal to a shaping time for a case of forming the unit layers in a single pass.

Further, in the three-dimensional object production method according to an embodiment of the disclosure, the forming step may include: a first forming step in which the nozzles in one of the regions form a first pixel row group; and a step in which the nozzles in another one of the regions, which is located downstream of the one region in the sub scanning direction and is adjacent to the one region, form a second pixel row group being different from the first pixel row group after the first forming step.

According to the above method, ejection control of droplets in one region is performed and when one scan by the head is finished, a region for ejecting droplets is switched to a next region to perform ejection control therefor. As above, according to the above method, multi-pass printing which forms one unit layer by ejecting droplets from nozzles included in one region by one pass and then ejecting droplets from nozzles included in a subsequent region in a subsequent pass can be performed.

In the three-dimensional object production method according to an embodiment of the disclosure, in the allocating step, the region of the nozzle row to be allocated to each of at least two pixels that are adjacent in a laminating direction along which the unit layers are laminated may be different from each other.

According to the above method, the pixels formed by one nozzle will not be arranged sequentially in the laminating direction as well, and are dispersed in the laminating direction as well. Due to this, even if droplet ejection failure or missing nozzle occurs, a groove can be prevented from being formed in the three-dimensional object in the laminating direction due to the pixels formed by the nozzle in which the droplet ejection failure or missing nozzle is occurring being arranged sequentially in the laminating direction.

The three-dimensional object production method according to an embodiment of the disclosure may further include: a detecting step of detecting a liquid amount of the droplets ejected from each of the nozzles; a first identifying step of identifying a failed nozzle, of which liquid amount of the droplets ejected within a preset time period is outside a predetermined range, from among the plurality of nozzles based on a detection result of the detecting step; a second identifying step of identifying a proximate nozzle that forms a pixel closest in the main scanning direction to a pixel formed by the failed nozzle; and an adjusting step of adjusting the liquid amount of the droplets ejected from the proximate nozzle in accordance with the liquid amount of the droplets ejected from the failed nozzle.

According to the above method, in a case where the failed nozzle in which the droplet ejection failure or missing nozzle is occurring exists, the liquid amount of the droplets ejected from the proximate nozzle is adjusted to compensate deficiency and excess of the liquid amount of the droplets ejected from the failed nozzle. Due to this, in the above method, even if the droplet ejection failure or missing nozzle occurs, the unit layers can more suitably be formed.

In the three-dimensional object production method according to an embodiment of the disclosure, in the adjusting step, in a case where the liquid amount of the droplets ejected from the failed nozzle within the preset time period is greater than the predetermined range, the liquid amount of the droplets ejected from the proximate nozzle may be reduced in accordance with the liquid amount of the droplets ejected from the failed nozzle, and in a case where the liquid amount of the droplets ejected from the failed nozzle within the preset time period is less than the predetermined range, the liquid amount of the droplets ejected from the proximate nozzle may be increased in accordance with the liquid amount of the droplets ejected from the failed nozzle.

According to the above method, in a case where a failed nozzle with excessive ejection exists, the liquid amount of the droplets ejected from the proximate nozzle is reduced in accordance with the liquid amount of the droplets ejected from the failed nozzle. Further, in a case where a failed nozzle with deficient ejection exists, the liquid amount of the droplets ejected from the proximate nozzle is increased in accordance with the liquid amount of the droplets ejected from the failed nozzle. As above, the deficiency and excess of the liquid amount of the droplets ejected from the failed nozzle can be compensated by adjusting the liquid amount of the droplets ejected from the proximate nozzle.

In order to solve the above problem, a three-dimensional object production apparatus according to an embodiment of the present application is a three-dimensional object production apparatus that shapes a three-dimensional object by laminating unit layers formed by ejecting droplets from a head, the head including: a nozzle row in which a plurality of nozzles are aligned along a sub scanning direction which intersects perpendicularly to a main scanning direction of the head, the nozzle row being divided into a predetermined number n (n being an integer ≥2) of regions in the sub scanning direction, the three-dimensional object production apparatus including an allocating unit that allocates one of the regions in the nozzle row that is different from each other to each of pixel groups, each of which is configured of pixels divided into groups of the predetermined number n in pixel rows constituting one of the unit layers and located at a predetermined interval in the main scanning direction, wherein the nozzles in each of the regions form the pixel rows by forming one of the pixel groups.

According to the above configuration, same effect as that of the three-dimensional object production method according to an embodiment of the disclosure can be achieved.

Effect of the Disclosure

According to an embodiment of the disclosure, unit layers can satisfactorily be formed even if droplet ejection failure or missing nozzle occurs.

DESCRIPTION OF EMBODIMENTS

First Embodiment

A three-dimensional object production method according to an embodiment of the disclosure will be described; however, firstly an overview of a production apparatus for producing a three-dimensional object to be produced in the present embodiment (hereafter termed a three-dimensional object production apparatus) will be described.

(Three-Dimensional Object Production Apparatus 10a)

Figure 1:
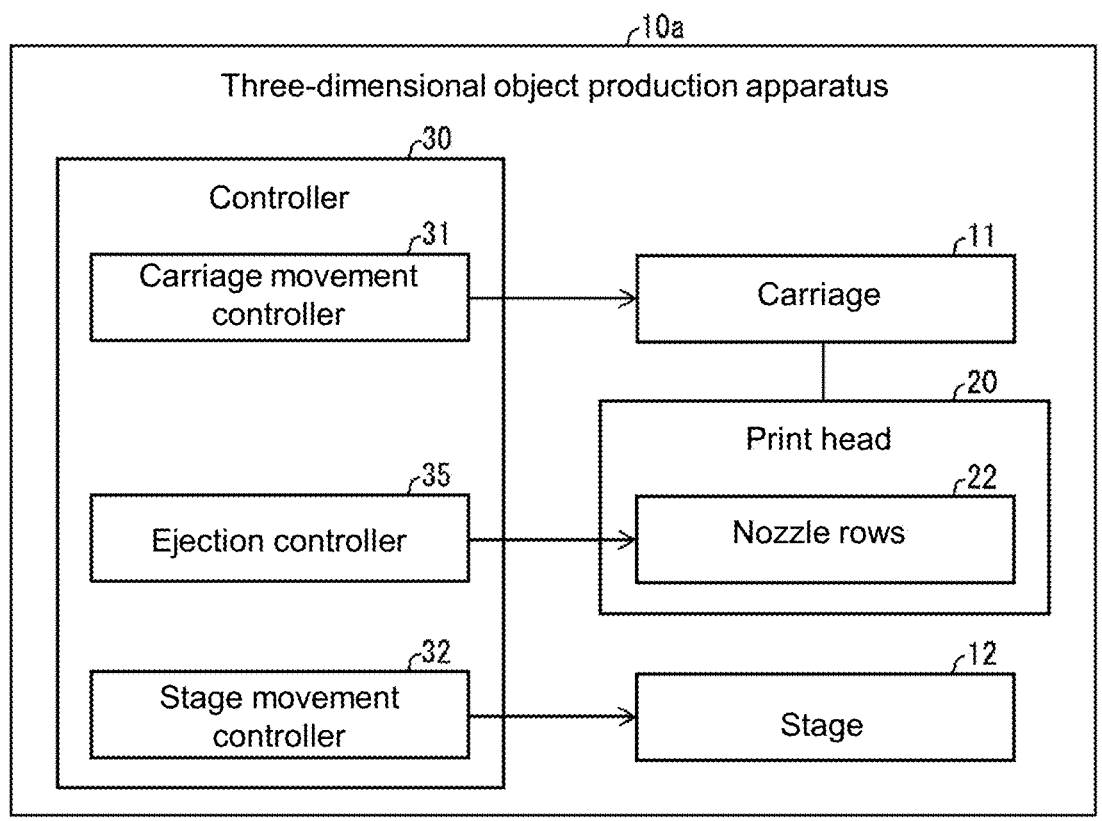
FIG. 1 is a functional block diagram illustrating a schematic configuration of a three-dimensional object production apparatus according to an embodiment of the disclosure.

FIG. 1 is a functional block diagram illustrating a schematic configuration of a three-dimensional object production apparatus 10a according to the embodiment of the disclosure. As illustrated in FIG. 1, the three-dimensional object production apparatus 10a includes a carriage 11, a stage 12, a print head 20 being a head, and a controller 30. The controller 30 includes a carriage movement controller 31, a stage movement controller 32, and an ejection controller 35 being an allocating unit.

[Carriage 11]

The carriage 11 mounts the print head 20 thereon, and is configured movable. The carriage movement controller 31 controls the carriage 11 to scan the print head 20 in a main scanning direction.

[Stage 12]

The stage 12 is a plate-like stage for depositing droplets ejected from the print head 20, and is configured movable. The stage movement controller 32 controls the stage 12 to move the stage 12 in a sub scanning direction that intersects perpendicularly to the main scanning direction, and to change a height of the stage 12 being a position thereof in a vertical direction.

It should be noted that in the present embodiment, a mode in which the stage 12 is moved in the sub scanning direction and the height of the stage 12 is changed will be described; however, the disclosure is not limited to this, and relative positions of the print head 20 and the stage simply need to change; and as such, it may be configured to move the carriage 11 in both the main scanning direction and the sub scanning direction and to change a height of the carriage 11.

[Print Head 20]

Figure 2:
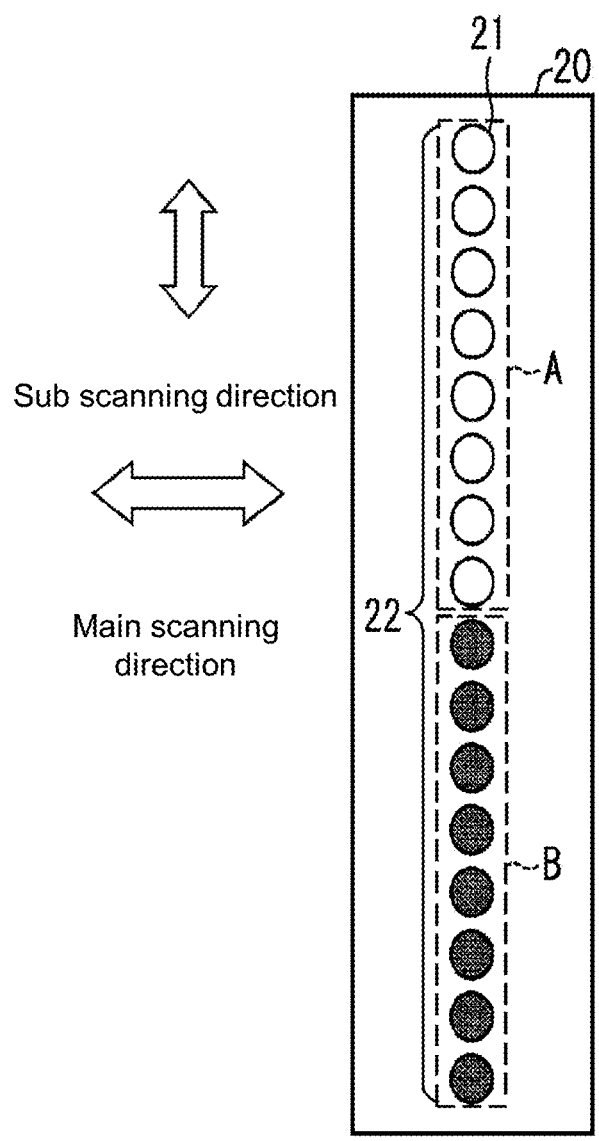
FIG. 2 is a schematic diagram illustrating a schematic configuration of a print head according to the embodiment of the disclosure.

FIG. 2 is a schematic diagram illustrating a schematic configuration of the print head 20. As illustrated in FIG. 2, the print head 20 includes a nozzle row 22 in which a plurality of nozzles 21 are arranged in the sub scanning direction. The nozzle row 22 is divided into a predetermined number n (n being an integer ≥2) of regions in the sub scanning direction, and in this figure, it is divided into two regions, namely a region A and a region B. Each of the nozzles 21 is configured capable of ejecting droplets.

It should be noted that in this figure, a configuration in which the print head 20 includes one nozzle row 22 is illustrated; however, the print head 20 may include a plurality of nozzle rows 22. In a case of including the plurality of nozzle rows 22, droplets of a modeling material, droplets of a support material, and droplets of a coloring material, which are droplets of different types, are ejected from the respective nozzle rows 22. Hereinbelow, to simplify the explanation, the explanation will focus on one nozzle row 22 to explain the three-dimensional object production apparatus and the three-dimensional object production method according to the disclosure. Thus, the explanation to be given hereinbelow regarding the nozzle row 22 applies to all the nozzle rows 22 in the case of providing the plurality of nozzle rows 22.

A lower surface of the print head 20 is arranged to face an upper surface of the stage 12, and the carriage movement controller 31 causes the print head 20 to scan in the main scanning direction and the ejection controller 35 causes the droplets to be ejected from a part of the nozzles 21 of the print head 20 to the stage 12, by which a plurality of unit layers spreading along the upper surface of the stage 12 can be laminated. The three-dimensional object is shaped on the stage in this manner.

A unit layer is a layer having a same thickness in a laminating direction or a same striking number of droplets striking per pixel for a plurality of pixels constituting the three-dimensional object, and formed on a same plane. Further, in a case of performing a flattening process on the unit layer using a roller and the like, each layer formed through the flattening process can be termed a unit layer. It should be noted that the striking number of the droplets per pixel is one or a plurality.

[Ejection Controller 35]

The ejection controller 35 creates allocation information based on shaping data of the three-dimensional object to be shaped, in which different ones of the regions of the nozzle row 22 to be used for pixel rows constituting a unit layer are allocated to each of a predetermined number of pixel (row) groups configured of pixels (row) located at a predetermined interval among the pixel rows constituting the unit layer. Further, the ejection controller 35 controls the droplet ejection by the print head 20 based on this allocation information to form each unit layer.

Specifically, the ejection controller 35 performs the ejection control for each region of the nozzle row 22 allocated to each pixel (row) group based on the allocation information, and causes one pixel (row) group to be formed by the nozzles 21 in one region accompanying the scan of the print head 20 in the main scanning direction performed by the carriage movement controller 31. It should be noted that the nozzles 21 in each region form a pixel (row) group different from that of the nozzles 21 in the other region. Further, the predetermined number as described above is same as a number of regions which the nozzle row 22 includes.

Here, the ejection controller 35 performs the ejection control of the droplets in one region accompanying a scan of the print head 20 in the main scanning direction, and when one scan of the print head 20 is finished, a region to eject the droplets is moved to a subsequent region located downstream of the aforementioned one region in the sub scanning direction, which is a region adjacent to the aforementioned one region to perform the ejection control. As above, the ejection controller 35 performs multi-pass printing, in which it causes the droplets to be ejected from the nozzles 21 included in the region A in a first pass to take place first and causes the droplets to be ejected from the nozzles 21 included in the region B in a second pass to take place next to form one unit layer.

(Three-Dimensional Object Production Method)

Figure 3A:
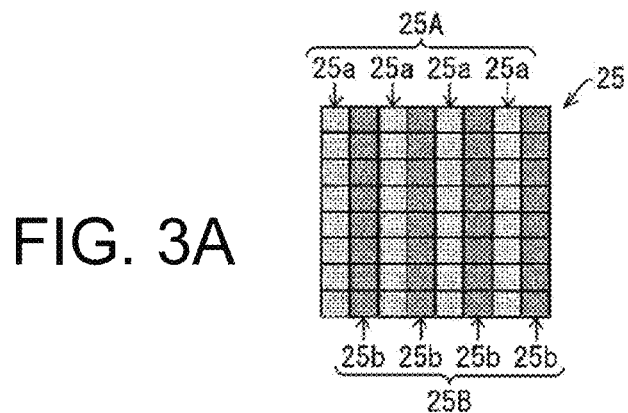
FIG. 3A is a schematic diagram illustrating unit layers.
Figure 3B:
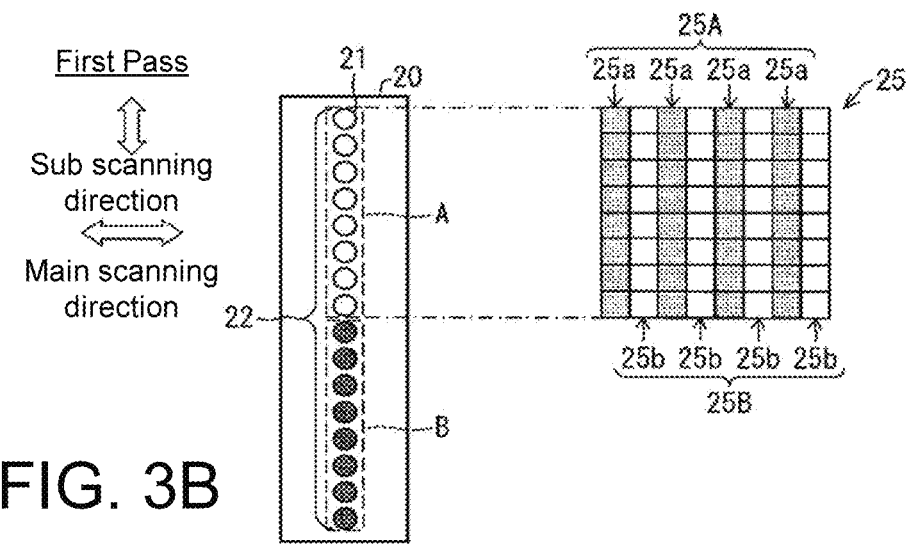
FIG. 3B and FIG. 3C are schematic diagrams illustrating relationships between a nozzle row of the print head and constituent pixels of the unit layers of the embodiment of the disclosure in each pass.
Figure 3C:
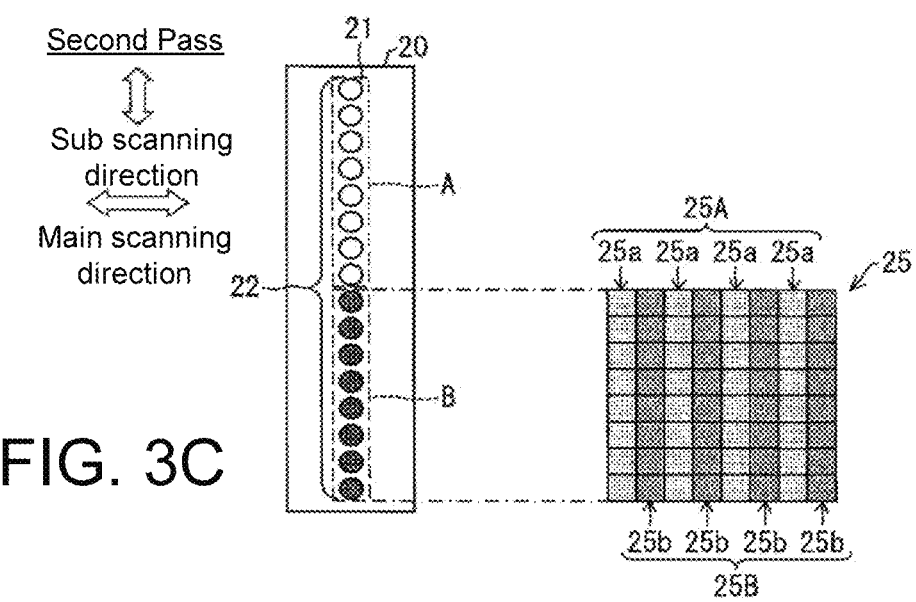
Figure 4:
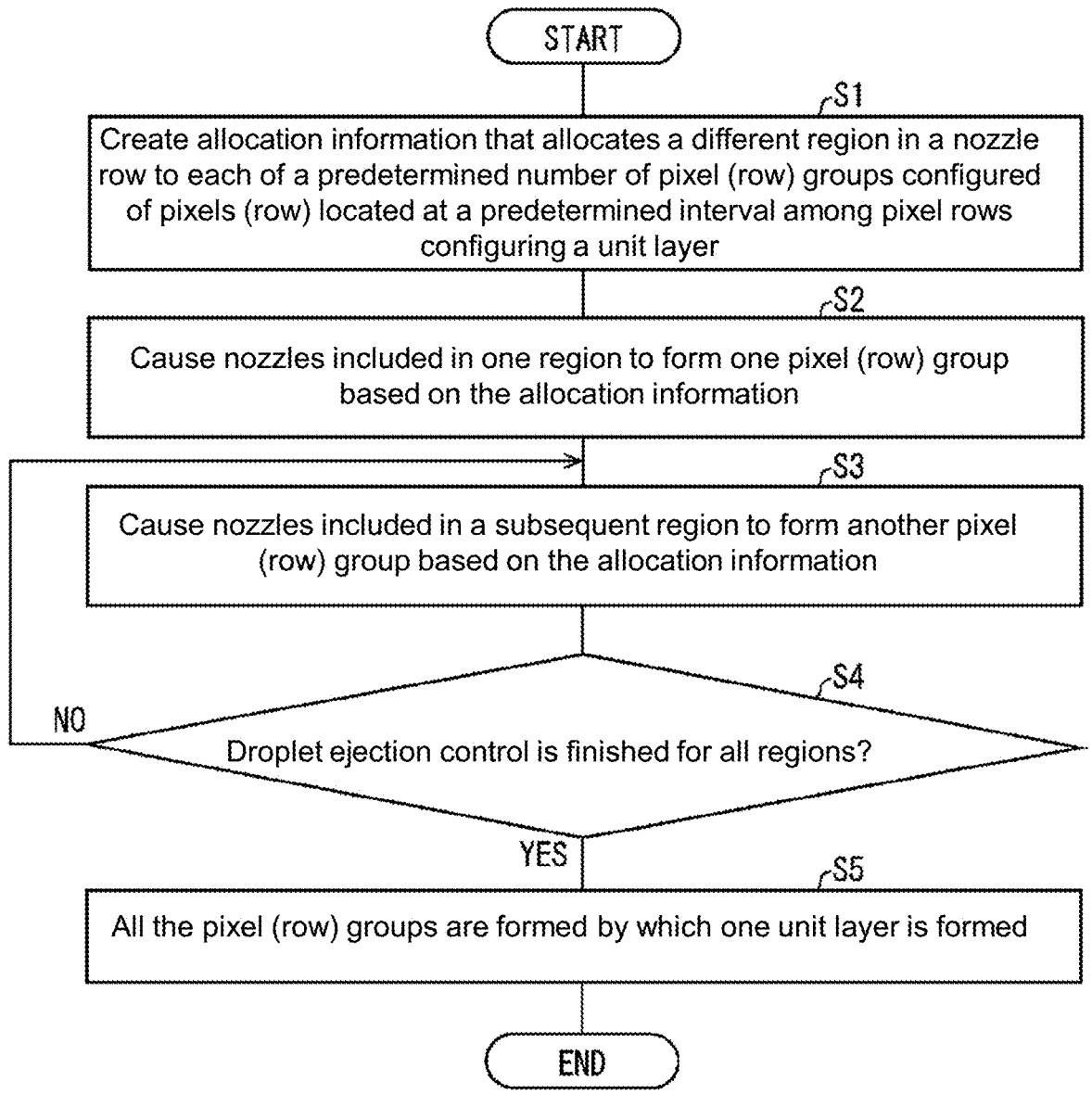
FIG. 4 is a flow diagram illustrating a flow of a three-dimensional object production method according to the embodiment of the disclosure.

In the three-dimensional object production apparatus 10a according to the present embodiment, a three-dimensional object production method for satisfactorily forming the unit layers despite occurrences of droplet ejection failure or missing nozzle is employed. This three-dimensional object production method will be described with reference to FIGS. 3A though 3C and 4. FIG. 3A is a schematic diagram illustrating the unit layers, FIG. 3B and FIG. 3C are schematic diagrams illustrating relationships between the nozzle row 22 of the print head 20 and constituent pixels of the unit layers in each pass. FIG. 4 is a flow diagram illustrating a flow of the three-dimensional object production method according to the embodiment.

In the three-dimensional object production apparatus 10a, when the shaping data of the three-dimensional object to be shaped is input to the controller 30, formation of the respective layers is started. Specifically, firstly the ejection controller 35 creates the allocation information in which the different ones of the regions of the nozzle row 22 to be used for pixel rows constituting a unit layer are allocated to each of the predetermined number of pixel (row) groups configured of pixels (row) located at the predetermined interval among the pixel rows constituting the unit layer. This three-dimensional object production method indicates step S1 in FIG. 4, which will be abbreviated hereinbelow as "S1".

In case of FIGS. 3A though 3C, as illustrated in FIG. 3A, the ejection controller 35 creates the allocation information that allocates the regions of the nozzle row 22 to a first pixel (row) group 25A configured of first pixels (row) 25a located at a predetermined interval among the pixel rows constituting a unit layer 25, and a second pixel (row) group 25B configured of second pixels (row) 25b which are different from the first pixels (row) 25a located at the predetermined interval among the pixel rows constituting a unit layer 25. Hereinbelow, the explanation will be given on a supposition of a case where the region A of the nozzle row 22 is allocated to the first pixel (row) group 25A and the region B of the nozzle row 22 is allocated to the second pixel (row) group 25B.

Further, in the first pass to take place first, the ejection controller 35 performs the ejection control of the droplets in one region in the nozzle row 22 based on the allocation information. Specifically, the ejection controller 35 forms one pixel (row) group with the nozzles 21 included in the one region based on the allocation information while the carriage movement controller 31 causes the print head 20 to scan in the main scanning direction. This three-dimensional object production method indicates S2. Further, the stage movement controller 32 moves the stage 12 in the sub scanning direction.

In case of FIGS. 3A though 3C, as illustrated in FIG. 3B, the ejection controller 35 performs the ejection control of the droplets in the region A, and causes the nozzles 21 included in the region A to form the first pixel (row) group 25A based on the allocation information. That is, for the nozzles 21 included in the region A, the first pixel (row) group 25A in the unit layer 25 is a droplet ejecting location, and the second pixel (row) group 25B which is another pixel (row) group in the unit layer 25 is a non-ejecting location of the droplets therefor.

In the second pass to take place next, the ejection controller 35 switches the region to eject the droplets to a subsequent region in the nozzle row 22 to perform the ejection control. Here, the subsequent region refers to the region located downstream of the aforementioned one region in the sub scanning direction and adjacent to the aforementioned one region. Specifically, the ejection controller 35 causes the nozzles 21 included in the subsequent region to form another pixel (row) group based on the allocation information while the carriage movement controller 31 causes the print head 20 to scan in the main scanning direction. This three-dimensional object production method indicates S3.

In case of FIGS. 3A though 3C, as illustrated in FIG. 3C, the ejection controller 35 performs the ejection control by switching the region to eject the droplets to the subsequent region B, and the nozzles 21 included in the region B are caused to form the second pixel (row) group 25B based on the allocation information. That is, the second pixel (row) group 25B in the unit layer 25 is the droplet ejecting location for the nozzles 21 included in the region B, and the first pixel (row) group 25A, which is the other pixel (row) group in the unit layer 25, is the droplet non-ejecting location therefor.

The ejection controller 35 repeats the above operations until the ejection control of the droplets is finished for all the regions. This three-dimensional object production method indicates NO in S4. The ejection controller 35 finishes the ejection control of the droplets for all the regions. This three-dimensional object production method indicates YES in S4. As above, all the pixel (row) groups are formed, as a result of which one unit layer 25 is formed. This three-dimensional object production method indicates S5.

In FIGS. 3A though 3C, the nozzles 21 included in the region A form the first pixels (row) 25a in the first pass, the nozzles 21 included in the region B form the second pixels (row) 25b between the first pixels (row) 25a in the second pass, and one unit layer 25 is formed by the above two passes.

As above, in the three-dimensional object production apparatus 10a, one pixel (row) group is half the pixels (row) constituting the unit layer 25 in one pass, and one unit layer 25 is completed by all the passes. Especially in the three-dimensional object production apparatus 10a, the first pixels (row) 25a are formed in the first pass at the predetermined interval and the second pixels (row) 25b are formed in the second pass in between the first pixels (row) 25a. That is, the pixels (row) located at the predetermined interval are formed in one pass.

Due to this, the pixels formed by one nozzle 21 do not align sequentially in the main scanning direction, and are dispersed in the main scanning direction. Due to this, even if droplet ejection failure or missing nozzle occurs, a groove can be prevented from being formed in the unit layer 25 in the main scanning direction due to the pixels formed by the nozzle 21 in which the droplet ejection failure or missing nozzle is occurring being aligned sequentially in the main scanning direction. As above, in the three-dimensional object production apparatus 10a, the unit layer 25 can be formed satisfactorily even if the droplet ejection failure or missing nozzle occurs.

Here, in normal multi-pass printing, shaping time is doubled if a pass number is doubled. However, in the three-dimensional object production apparatus 10a, since the pixels (row) that is half the pixels (row) constituting the unit layer 25 are formed regularly in one pass at the equal interval, a scan resolution of the print head 20 becomes half a resolution of the unit layer 25 to be produced. Due to this, a scan speed per one pass becomes twice a scan speed of scanning by the resolution of the unit layer 25 to be shaped. That is, in a case where the resolution of the unit layer 25 in the main scanning direction is 600 dpi, the scan resolution of the print head 20 can be set to 300 dpi so that its scan speed is twice that in the case of scanning at the resolution of 600 dpi.

As above, in the three-dimensional object production apparatus 10a, since one pixel (row) group is formed at the equal interval in one pass, and one unit layer 25 is completed by all the passes, the scan resolution of the print head 20 can be reduced and the scan speed per one pass becomes faster as compared to the normal multi-pass printing. Thus, in the three-dimensional object production apparatus 10a, since the scan speed per one pass is doubled even if the number of passes is doubled, the shaping time can be made equal to the shaping time for the case of forming the unit layer 25 by a single pass.

It should be noted that in the above, the embodiment in which the nozzle row 22 is divided into two regions in the sub scanning direction, namely into the region A and the region B, has been presented; however, the disclosure is not limited to this. For example, the nozzle row 22 may be divided into three regions in the sub scanning direction. In this case, the ejection controller 35 allocates different one of regions of the nozzle row 22 to each of three pixel (row) groups, which are configured of pixels (row) with a predetermined interval located every two pixels (row), among the pixel rows constituting the unit layer 25, and causes the nozzles 21 in each region to form a plurality of pixels (row) at the equal interval, thereby forming their corresponding pixel (row) group.

That is, the unit layer 25 is formed by three passes, and the pixels (row) formed by the nozzles 21 in the first region, the pixels (row) formed by the nozzles 21 in the second region, and the pixels (row) formed by the nozzles 21 in the third region are formed by aligning orderly in the main scanning direction. In this case as well, the scan speed per one pass is tripled though the pass number is tripled in the three-dimensional object production apparatus 10a by setting the scan resolution of the print head 20 to ⅓, so that its shaping time can be made equal to the shaping time for the case of forming the unit layer 25 by the single pass.

It should be noted that in the above, the configuration in which one unit layer 25 is completed by all the passes; however, the disclosure is not necessarily limited to this. For example, in a case where one unit layer is large, this unit layer is divided into plural sections, and shaping is performed in section units. In this case, the "unit layer 25" in the foregoing explanation related to S2 to S5 can be substituted with "a section of the unit layer", and the foregoing operations of S2 to S5 may be performed for each of the sections of the unit layer. Due to this, one section of the unit layer is formed by all the passes, and one unit layer is completed by forming all the sections of the unit layer.

(Allocation of Nozzle Row Regions in Upper and Lower Layers)

Figure 5A:
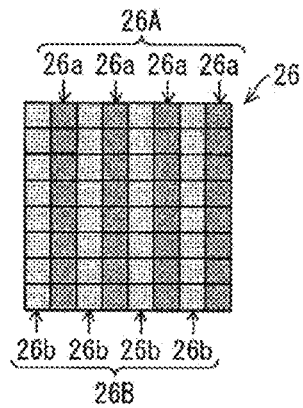
FIG. 5A is a schematic diagram illustrating unit layers.
Figure 5B:
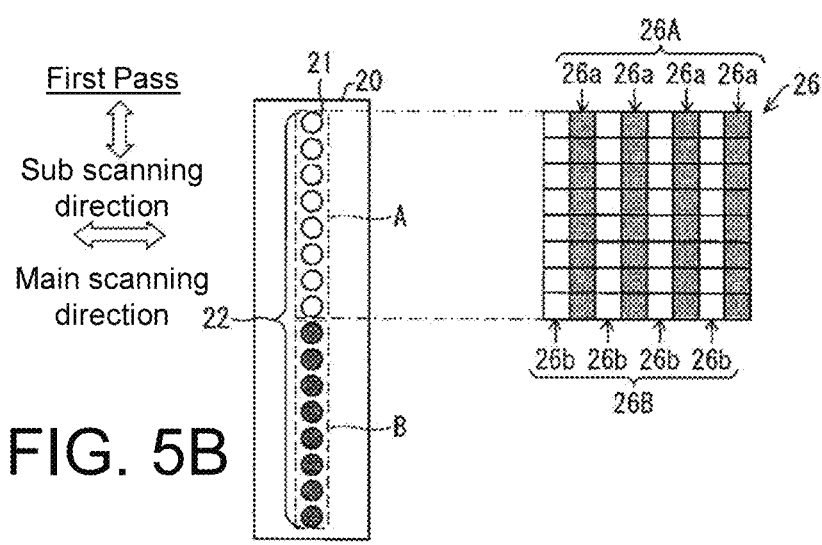
FIG. 5B and FIG. 5C are schematic diagrams illustrating relationships between a nozzle row of a print head and constituent pixels of the unit layers of the embodiment of the disclosure in each pass.
Figure 5C:
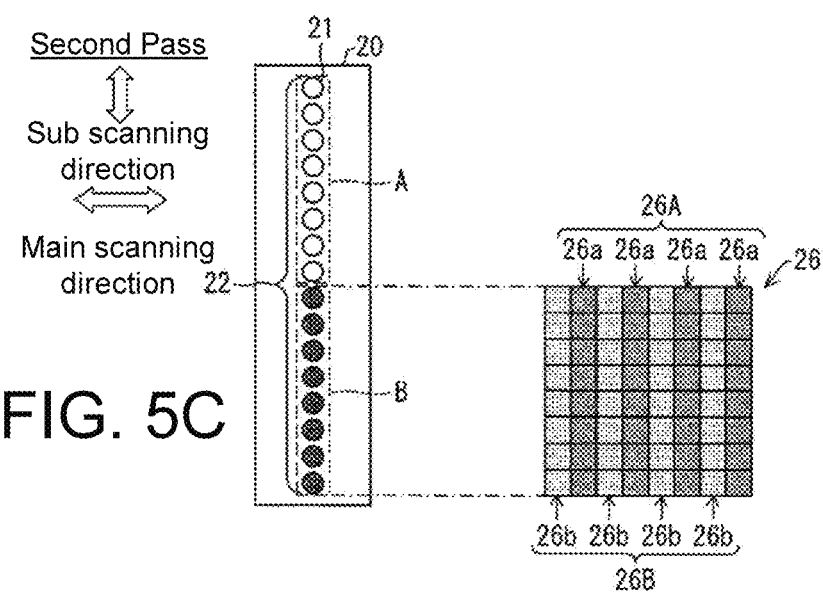
Figure 6A:
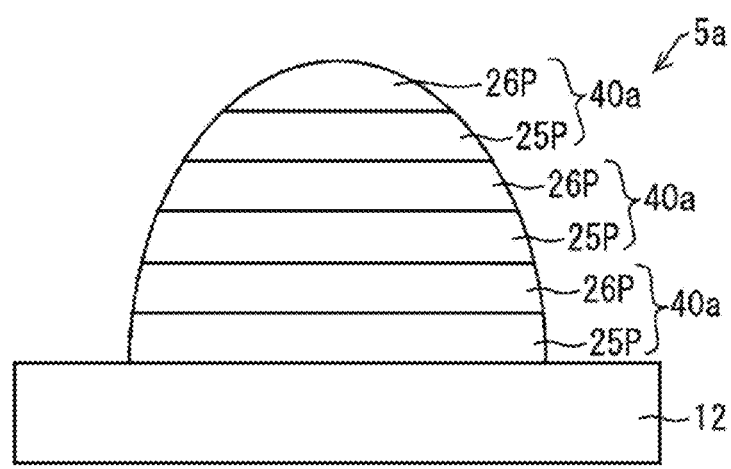
FIG. 6A is a cross-sectional diagram illustrating a three-dimensional part to be formed.
Figure 6B:
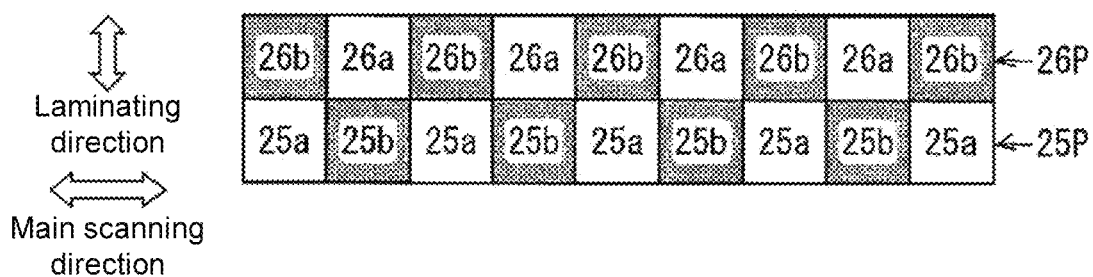
FIG. 6B is a schematic diagram illustrating a forming order of constituent pixels of respective unit layers in one unit layer group.

An allocation of the regions in the nozzle row 22 in upper and lower layers in the laminating direction to laminate the unit layers 25 will be described with reference to FIGS. 5A though 5C and 6A though 6B. FIG. 5A is a schematic diagram illustrating a unit layer 26, and FIG. 5B and FIG. 5C are schematic diagrams illustrating relationships between the nozzle row 22 of the print head 20 and constituent pixels of the unit layer 26 in each pass. Further, FIG. 6A is a cross-sectional diagram illustrating a three-dimensional part 5a to be formed, and FIG. 6B is a schematic diagram illustrating a forming order of constituent pixels of respective unit layers in one unit layer group.

The unit layer 26 illustrated in FIG. 5A is the unit layer located on the unit layer 25 illustrated in FIGS. 3A though 3C as its upper layer. The ejection controller 35 creates allocation information for the unit layer 26 as well, in which the regions of the nozzle row 22 are allocated to a first pixel (row) group 26A configured of first pixels (row) 26a located at a predetermined interval among the pixel rows constituting the unit layer 26 and a second pixel (row) group 26B configured of second pixels (row) 26b different from the first pixels (row) 26a among the pixel rows constituting the unit layer 26.

At this occasion, the ejection controller 35 allocates a region of the nozzle row 22 that is different from the pixel (row) in the unit layer 25 located in the lower layer for each pixel (row) in the unit layer 26. That is, the ejection controller 35 causes the regions of the nozzle row 22 to be allocated to each of two pixels that are adjacent in the laminating direction of the unit layer 25 and the unit layer 26 to be different.

In FIG. 5A, the ejection controller 35 allocates the region A of the nozzle row 22 to the first pixels (row) 26a located in the upper layer of the second pixels (row) 25b formed by the nozzles 21 included in the region B in the unit layers 25, and allocates the region B of the nozzle row 22 to the second pixels (row) 26b located in the upper layer of the first pixels (row) 25a formed by the nozzles 21 included in the region A in the unit layers 25. That is, in the unit layer 26, from a left end in the drawing, the pixels (row) 26b formed by the nozzles 21 included in the region B and the pixels (row) 26a formed by the nozzles 21 included in the region A are aligned in this order.

Then, in a first pass to take place first, as illustrated in FIG. 5B, the ejection controller 35 performs the ejection control of the droplets in the region A, and causes the nozzles 21 included in the region A to form the first pixels (row) 26a based on the allocation information. In a second pass to take place next, as illustrated in FIG. 5C, the ejection controller 35 performs the ejection control by switching the region to eject the droplets to the subsequent region B, and causes the nozzles 21 included in the region B to form the second pixels (row) 26b based on the allocation information.

In a case of forming a unit layer that is an upper layer of the unit layer 26, similarly, the ejection controller 35 allocates the regions of the nozzle row 22 that are different from the pixels (row) in the unit layer 26 located at its lower layer for the respective pixels (row) in the unit layer which is the upper layer of the unit layer 26. That is, the ejection controller 35 allocates the regions of the nozzle row 22 to the unit layer which is the upper layer of the unit layer 26 in a same way as the unit layer 25. Accordingly, in the unit layer which is the upper layer of the unit layer 26, as illustrated in FIG. 3A, the pixels (row) 25a formed by the nozzles 21 included in the region A and the pixels (row) 25b formed by the nozzles 21 included in the region B are aligned in this order from a left end in the drawing.

According to the above, as illustrated in FIG. 6A, the three-dimensional object 5a is formed by repeatedly laminating unit layer groups 40a, each of which including a unit layer 25P to which the regions of the nozzle row 22 are allocated similarly to the unit layer 25 and a unit layer 26P to which the regions of the nozzle row 22 are allocated similarly to the unit layer 26, in the laminating direction.

Due to this, as illustrated in FIG. 6B, the second pixels (row) 26b formed by the nozzles 21 included in the region B in the unit layer 26P are formed in the upper layer of the first pixels (row) 25a formed by the nozzles 21 included in the region A in the unit layer 25P, and the first pixels (row) 26a formed by the nozzles 21 included in the region A in the unit layer 26P are formed in the upper layer of the second pixels (row) 25b formed by the nozzles 21 included in the region B in the unit layer 25P. That is, the two pixels adjacent in the laminating direction in the unit layers 25P and 26P are respectively formed by the nozzles 21 that are included in different regions from each other.

Due to this, the pixels formed by one nozzle 21 also do not align sequentially in the laminating direction, and are dispersed in the laminating direction as well. Due to this, even if the droplet ejection failure or missing nozzle occurs, a groove can be prevented from being formed in the three-dimensional object 5a in the laminating direction because of the pixels formed by the nozzle 21 in which the droplet ejection failure or missing nozzle is occurring being aligned sequentially in the laminating direction. As above, in the three-dimensional object production apparatus 10a, the three-dimensional object 5a can be formed satisfactorily despite the occurrence of the droplet ejection failure or missing nozzle.

Figure 7A:
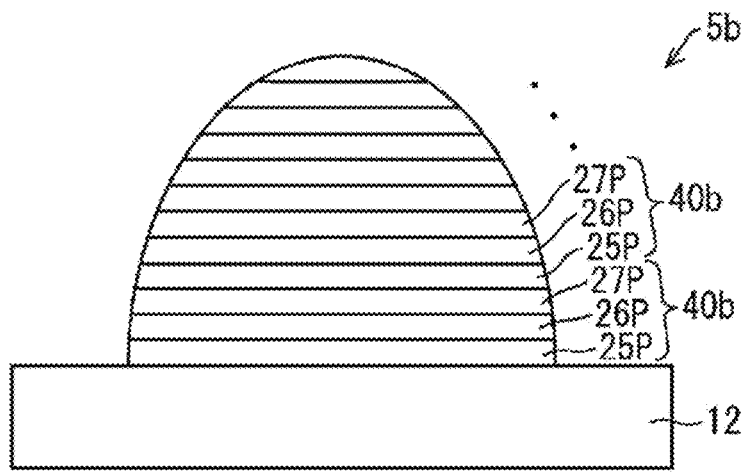
FIG. 7A is a cross-sectional diagram illustrating a three-dimensional part to be formed.
Figure 7B:
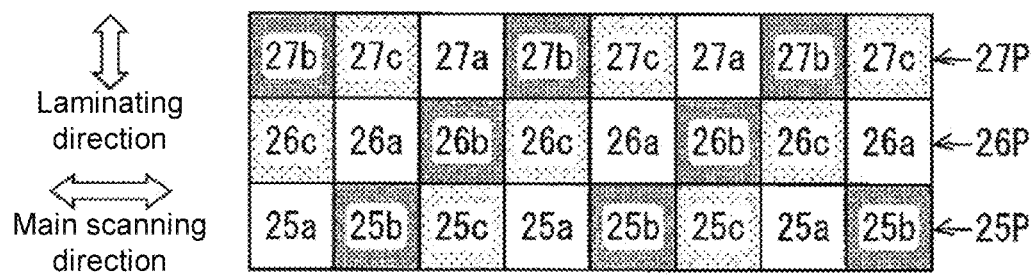
FIG. 7B and FIG. 7C are schematic diagrams illustrating a forming order of constituent pixels of respective unit layers in one unit layer group.
Figure 7C:
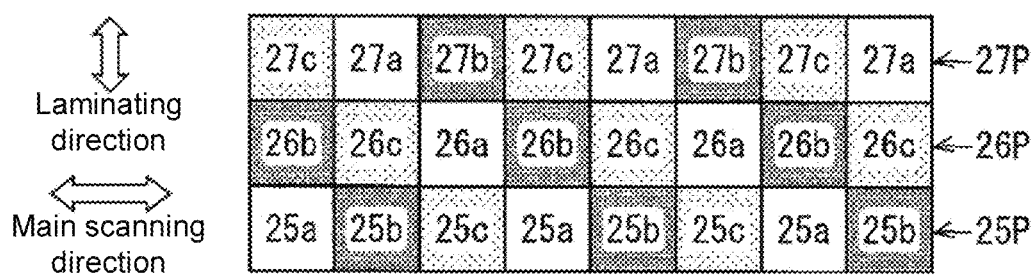

It should be noted that the same applies to the case of dividing the nozzle row 22 into three or more regions in the sub scanning direction. Next, the case of dividing the nozzle row 22 into three regions in the sub scanning direction will be described with reference to FIGS. 7A though 7C. FIG. 7A is a cross-sectional diagram illustrating a three-dimensional part 5b to be formed, and FIG. 7B and FIG. 7C are schematic diagrams illustrating a forming order of constituent pixels of respective unit layers in one unit layer group.

In this case as well, for each pixel (row) in each unit layer, the ejection controller 35 allocates the region of the nozzle row 22 that is different from the region for the pixel (row) in the unit layer located thereunder. That is, the ejection controller 35 causes the region of the nozzle row 22 to be allocated to each of three pixels that are adjacent in the laminating direction of the unit layers to be different.

According to the above, as illustrated in FIG. 7A, the three-dimensional object 5b is formed by repeatedly laminating the unit layer groups 40b configured of the unit layers 25P with which the region of the nozzle row 22 is allocated according to a first allocation method, the unit layers 26P with which the region of the nozzle row 22 is allocated according to a second allocation method, and unit layers 27P with which the region of the nozzle row 22 is allocated according to a third allocation method, in the laminating direction.

It should be noted that "Allocation methods of the regions of the nozzle row 22" can be termed in other words as arrangements of first to third pixels (row) in each unit layer formed by the nozzles 21 included in the first to third regions. As illustrated in FIG. 7B, in the unit layer 25P, pixels (row) 25a formed by the nozzles 21 included in the first region, pixels (row) 25b formed by the nozzles 21 included in the second region, and pixels (row) 25c formed by the nozzles 21 included in the third region are arranged orderly from a left end of the drawing.

Further, in the unit layer 26P, pixels (row) 26c formed by the nozzles 21 included in the third region, pixels (row) 26a formed by the nozzles 21 included in the first region, and pixels (row) 26b formed by the nozzles 21 included in the second region are arranged orderly from the left end of the drawing, and in the unit layer 27P, pixels (row) 27b formed by the nozzles 21 included in the second region, pixels (row) 27c formed by the nozzles 21 included in the third region, and pixels (row) 27a formed by the nozzles 21 included in the first region are arranged orderly from the left end of the drawing.

Due to this, the third pixels (row) 26c formed by the nozzles 21 included in the third region in the unit layer 26P are formed in the upper layer of the first pixels (row) 25a formed by the nozzles 21 included in the first region in the unit layer 25P, and in the upper layer thereof, the second pixels (row) 27b formed by the nozzles 21 included in the second region in the unit layer 27P are formed. The same applies to the second pixels (row) 25b and the third pixels (row) 25c formed by the nozzles 21 included in the second region and the third region in the unit layer 25P. That is, each of the three pixels adjacent in the laminating direction of the unit layers are formed by then nozzles 21 included in different regions from each other.

It should be noted that as illustrated in FIG. 7C, the second pixels (row) 26b formed by the nozzles 21 included in the second region in the unit layer 26P may be formed in the upper layer of the first pixels (row) 25a formed by the nozzles 21 included in the first region in the unit layer 25P, in the upper layer of which the third pixels (row) 27c formed by the nozzles 21 included in the third region in the unit layer 27P may be formed, and there is no limitation to a forming order that is a laminating order of the three pixels adjacent in the laminating direction.

As above, since each of the three pixels adjacent in the laminating direction of the unit layers are formed by the nozzles 21 included in the regions different from each other, the pixels formed by one nozzle 21 do not align sequentially in the laminating direction as well, and are dispersed in the laminating direction as well. Due to this, even if the droplet ejection failure or missing nozzle occurs, a groove can be prevented from being formed in the three-dimensional object 5b in the laminating direction due to the pixels formed by the nozzle 21 in which the droplet ejection failure or missing nozzle is occurring being aligned sequentially in the laminating direction.

It should be noted that in FIG. 7B and FIG. 7C, each of the three pixels adjacent in the laminating direction of the unit layers are formed by the nozzles 21 included in the regions different from each other; however, no limitation is made necessarily hereto. For example, the pixels formed by one nozzle 21 does not align sequentially in the laminating direction even when each of at least two pixels adjacent in the laminating direction of the unit layers is formed by the nozzles 21 included in the regions different from each other, so that they are dispersed in the laminating direction as well. Due to this, even if the droplet ejection failure or missing nozzle occurs, a groove can be prevented from being formed in the three-dimensional object 5b in the laminating direction due to the pixels formed by the nozzle 21 in which the droplet ejection failure or missing nozzle is occurring being aligned sequentially in the laminating direction.

Second Embodiment

In the present embodiment, a three-dimensional object production method for more suitably forming unit layers in the case where droplet ejection failure or missing nozzle occurs will be described, and an overview of a three-dimensional object production apparatus for shaping a three-dimensional object to be produced in the present embodiment will firstly be described.

(Three-Dimensional Object Production Apparatus 10b)

Figure 8:
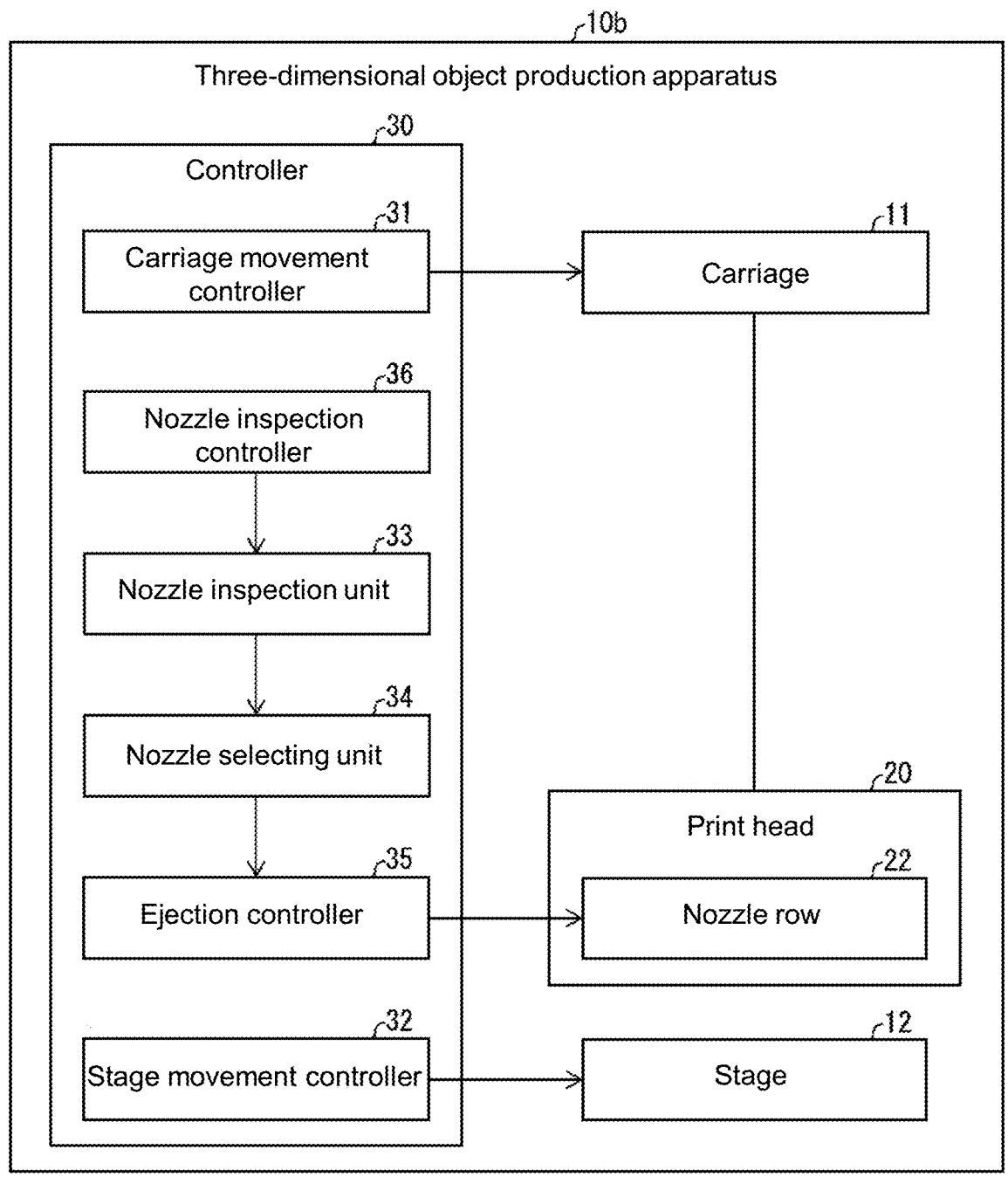
FIG. 8 is a functional block diagram illustrating a schematic configuration of a three-dimensional object production apparatus according to another embodiment of the disclosure.

FIG. 8 is a functional block diagram illustrating a schematic configuration of a three-dimensional object production apparatus 10b of another embodiment of the disclosure. It should be noted that members similar to those of the first embodiment are given same component numbers, and description thereof will be omitted. As illustrated in FIG. 8, the three-dimensional object production apparatus 10b includes a carriage 11, a stage 12, a print head 20, and a controller 30. The controller 30 includes a carriage movement controller 31, a stage movement controller 32, a nozzle inspection unit 33, a nozzle selecting unit 34, an ejection controller 35, and a nozzle inspection controller 36.

(Nozzle Inspection Unit 33)

The nozzle inspection unit 33 performs nozzle inspection of detecting a liquid amount of the droplets ejected from each nozzle 21 in a preset time period.

It should be noted that the nozzle inspection may be performed in a conventionally known method, and in the present embodiment, a case of detecting the liquid amount of the droplets ejected from each nozzle 21 in the preset time period using a photosensor. Specifically, the nozzle inspection unit 33 detects the liquid amount of the droplets ejected from each nozzle 21 in the preset time period based on a degree by which light of the photosensor is interrupted.

As another example of the nozzle inspection, a method of ejecting the droplets on a test ejection region and thereafter confirming states of the ejected droplets may be exemplified. However, since a distance between the print head 20 and the stage 12 changes in the course of shaping a three-dimensional object, the nozzle inspection using the photosensor is preferably performed to perform more accurate nozzle inspection.

[Nozzle Selecting Unit 34]

The nozzle selecting unit 34 identifies a failed nozzle from among the plurality of nozzles 21, of which liquid amount of the droplets ejected therefrom in the preset time period is outside a predetermined range, based on a detection result of the nozzle inspection unit 33. That is, the nozzle selecting unit 34 identifies the failed nozzle in which a normal droplet ejection has become impossible by causes such as droplet clogs or the like and in which the droplet ejection failure or missing nozzle is occurring.

It should be noted that the nozzle selecting unit 34 identifies not only the failed nozzle with deficient ejection, with the liquid amount of the ejected droplets being less than the predetermined range, but also a failed nozzle with an excessive ejection, with the liquid amount of the ejected droplets being greater than the predetermined range as the failed nozzle in which the ejection failure is occurring.

When a failed nozzle is identified from among the plurality of nozzles 21, the nozzle selecting unit 34 identifies a proximate nozzle that forms pixels closest to pixels formed by this failed nozzle in the main scanning direction based on shaping data of the three-dimensional object to be shaped. Then, the nozzle selecting unit 34 sends information of the liquid amount of the droplets ejected by the failed nozzle and information of the proximate nozzle to the ejection controller 35.

[Ejection Controller 35]

In a case where the failed nozzle is included in the plurality of nozzles 21, the ejection controller 35 adjusts the liquid amount of the droplets to be ejected from the proximate nozzle identified by the nozzle selecting unit 34 according to the liquid amount of the droplets ejected by the failed nozzle based on the information received from the nozzle selecting unit 34, and causes the droplets to be ejected from the print head 20.

[Nozzle Inspection Controller 36]

The nozzle inspection controller 36 controls the nozzle inspection by the nozzle inspection unit 33. Specifically, the nozzle inspection controller 36 controls a timing of the nozzle inspection by the nozzle inspection unit 33 and the nozzles 21 to be an inspection target.

In the present embodiment, the nozzle inspection controller 36 controls the nozzle inspection unit 33 so that the nozzle inspection is performed on a nozzle 21 before forming a unit layer that uses the droplets ejected from the inspection target nozzle 21 and after having formed the unit layer that is immediately beneath the aforementioned unit layer. By performing the nozzle inspection at the timing that is closer to just before using the nozzle 21 being the inspection target, the ejection failure or missing nozzle can more effectively be found even for a nozzle 21 of which frequency of use is low.

It should be noted that in the present embodiment, a configuration that controls the nozzle inspection of the nozzle inspection unit 33 by the nozzle inspection controller 36 is described; however, the disclosure is not limited to such a configuration. For example, the nozzle inspection may be performed by a user operating the three-dimensional object production apparatus 10b.

(Three-Dimensional Object Production Method)

Figure 9A:
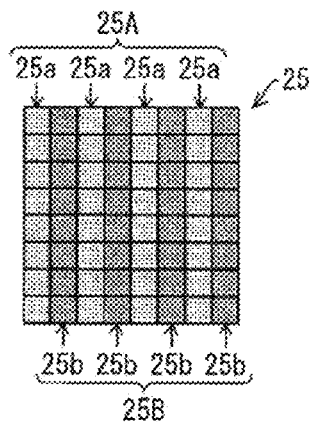
FIG. 9A is a schematic diagram illustrating unit layers.
Figure 9B:
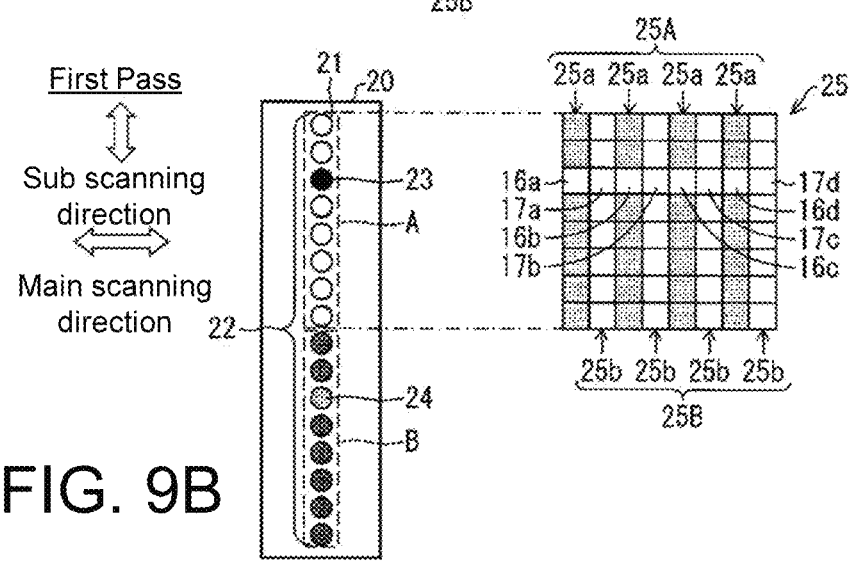
FIG. 9B and FIG. 9C are schematic diagrams illustrating relationships between a nozzle row of a print head and constituent pixels of the unit layers of the other embodiment of the disclosure in each pass.
Figure 9C:
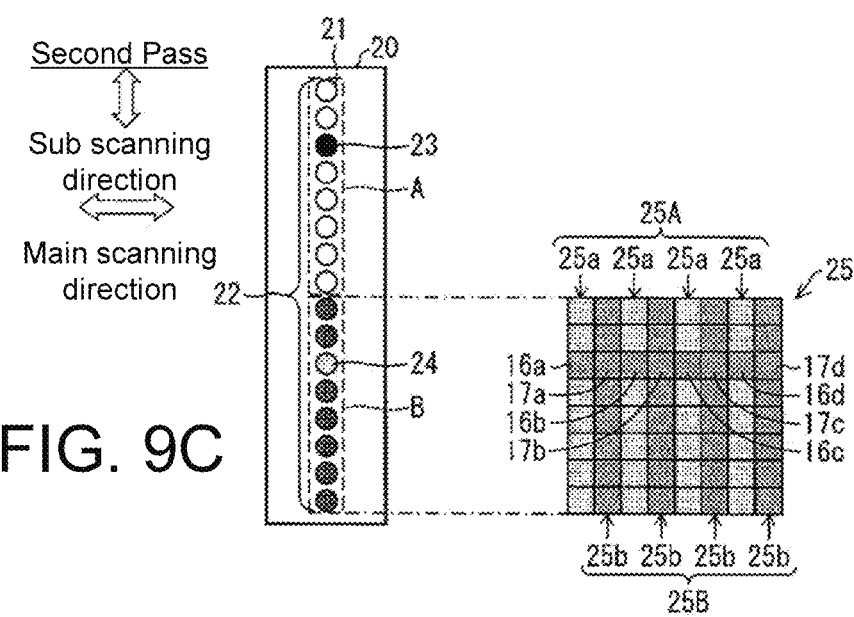
Figure 10:
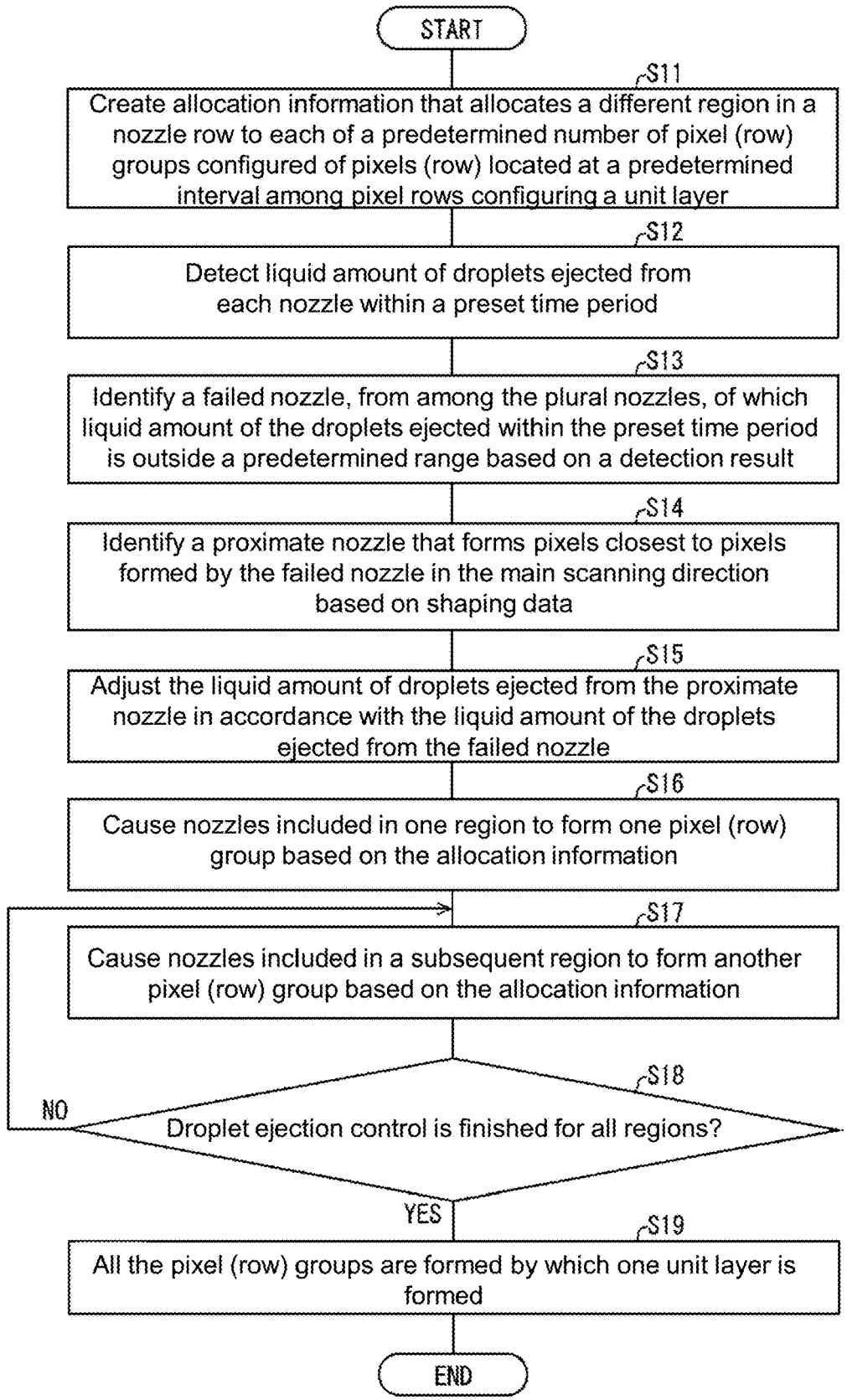
FIG. 10 is a flow diagram illustrating a flow of a three-dimensional object production method according to the other embodiment of the disclosure.

A specific three-dimensional object production method using the three-dimensional object production apparatus 10b according to the present embodiment will be described with reference to FIGS. 9A though 9C and 10. FIG. 9A is schematic diagram illustrating the unit layers, and FIG. 9B and FIG. 9C are schematic diagrams illustrating a relationship between the nozzle rows of the print head and constituent pixels of the unit layers of another embodiment of the disclosure in each pass. FIG. 10 is a flow diagram illustrating a flow of the three-dimensional object production method of the other embodiment of the disclosure.

In the three-dimensional object production apparatus 10b, when the shaping data of the three-dimensional object to be shaped is input to the controller 30, the nozzle inspection unit 33 performs the nozzle inspection of each nozzle 21 before starting formation of a voluntary unit layer 25. Specifically, firstly, the ejection controller 35 creates allocation information that allocates different one of regions of the nozzle row 22 to each of a predetermined number of pixel (row) groups configured of pixels (row) located at a predetermined interval among the pixel rows constituting the unit layer. This three-dimensional object production method indicates step S11 of FIG. 10, which will hereinbelow be abbreviated as "S11".

In the case of FIGS. 9A though 9C, as illustrated in FIG. 9A, the ejection controller 35 creates the allocation information that allocates the regions of the nozzle row 22 to the first pixel (row) group 25A configured of the first pixels (row) 25a located at a predetermined interval among the pixel rows constituting the unit layer 25, and to the second pixel (row) group 25B configured of the second pixels (row) 25b located at a predetermined interval which are different from the first pixels (row) 25a among the pixel rows constituting the unit layer 25. Hereinbelow, description will be given by supposing a case where the region A of the nozzle row 22 is allocated to the second pixel (row) group 25A and the region B of the nozzle row 22 is allocated to the second pixel (row) group 25B.

Further, the nozzle inspection controller 36 causes the nozzle inspection unit 33 to detect the liquid amount of the droplets ejected from the respective nozzles 21 within the preset time period as the nozzle inspection of the respective nozzles 21. This three-dimensional object production method indicates S12.

The nozzle selecting unit 34 identifies a nozzle with the liquid amount of the droplets ejected within the preset time period being outside the predetermined range as a failed nozzle from among the plurality of nozzles 21 based on the detection result of the nozzle inspection unit 33. This three-dimensional object production method indicates S13. In FIG. 9B, it is assumed that the third nozzle 21 from an upper side of a sheet surface in region A is the failed nozzle 23 in which a missing nozzle is occurring.

Next, the nozzle selecting unit 34 identifies the proximate nozzle that forms the pixels most proximate to the pixels formed by the failed nozzle 23 in the main scanning direction based on the shaping data of the three-dimensional object to be shaped. This three-dimensional object production method indicates S14. In FIG. 9B, the pixels most proximate to pixels 16*a* to 16*d* formed by the failed nozzle 23 in the main scanning direction are pixels 17*a* to 17*d*. Since the nozzle that forms these pixels 17*a* to 17*d* is the third nozzle 21 in the region B from the upper side of the sheet surface, the nozzle selecting unit 34 identifies this nozzle 21 as the proximate nozzle 24.

Then, the nozzle selecting unit 34 sends information of the liquid amount of the droplets ejected by the failed nozzle and information of the proximate nozzle to the ejection controller 35. The ejection controller 35 adjusts the liquid amount of the droplets ejected from the proximate nozzle 24 according to the liquid amount of the droplets ejected by the failed nozzle 23 based on the information received from the nozzle selecting unit 34. This three-dimensional object production method indicates S15.

In FIGS. 9A though 9C, since the missing nozzle is occurring in the failed nozzle 23, the liquid amount of the droplets ejected by the failed nozzle 23 is zero. Thus, the ejection controller 35 increases the liquid amount of the droplets ejected from the proximate nozzle 24 and causes the droplets to be ejected from the proximate nozzle 24. An increased amount of the liquid amount of the droplets ejected from the proximate nozzle 24 is at an amount that enables the proximate nozzle 24 to form the pixels 16*a* to 16*d*, which should have been formed by the failed nozzle 23 as a substitute thereof.

After this, the ejection controller 35 starts formation of the respective unit layers 25. Firstly, in the first pass that is an initial pass, the ejection controller 35 performs the ejection control of the droplets in one of the regions of the nozzle row 22 based on the allocation information. Specifically, the ejection controller 35 forms one pixel (row) group with the nozzles 21 included in the one region based on the allocation information while the carriage movement controller 31 causes the print head 20 to scan in the main scanning direction. This three-dimensional object production method indicates S16. Further, the stage movement controller 32 moves the stage 12 in the sub scanning direction.

In the case of FIGS. 9A though 9C, as illustrated in FIG. 9B, the ejection controller 35 performs the ejection control of the droplets in the region A, and causes the nozzles 21 included in the region A to form the first pixel (row) group 25A based on the allocation information. That is, for the nozzles 21 included in the region A, the first pixel (row) group 25A in the unit layer 25 is a droplet ejecting location, and the second pixel (row) group 25B which is another pixel (row) group in the unit layer 25 is a non-ejecting location of the droplets therefor.

Here, since the failed nozzle 23 is included in the region A, the pixels 16*a* to 16*d* that should have been formed by the failed nozzle 23 are not formed.

In the subsequent second pass, the ejection controller 35 switches the region to eject the droplets to the subsequent region based on the allocation information and performs the ejection control therefor. Here, the subsequent region refers to the region located downstream of the aforementioned one region in the sub scanning direction and adjacent to the aforementioned one region. Specifically, the ejection controller 35 causes the nozzles 21 included in the subsequent region to form another pixel (row) group based on the allocation information while the carriage movement controller 31 causes the print head 20 to scan in the main scanning direction. This three-dimensional object production method indicates S17.

In the case of FIGS. 9A though 9C, as illustrated in FIG. 9C the ejection controller 35 performs the ejection control by having switched the region to eject the droplets to the subsequent region B, and causes the nozzles 21 included in the region B to form the second pixel (row) group 25B based on the allocation information. That is, the second pixel (row) group 25B in the unit layer 25 is the droplet ejecting location for the nozzles 21 included in the region B, and the first pixel (row) group 25A, which is the other pixel (row) group in the unit layer 25, is the droplet non-ejecting location therefor.

Here, upon causing the droplets to be ejected from the proximate nozzle 24, the ejection controller 35 causes the droplets by the liquid amount determined in S15 to be ejected from the proximate nozzle 24. Due to this, not only the pixels 17*a* to 17*d* but also a layer of a portion for the pixels 16*a* to 16*d* that should have been formed by the failed nozzle 23 are formed by the proximate nozzle 24.

The ejection controller 35 repeats the above operations until the ejection control of the droplets is finished for all the regions. This three-dimensional object production method indicates NO in S18. After this, the ejection controller 35 completes the ejection control of the droplets for all the regions. This three-dimensional object production method indicates YES in S18. As above, all the pixel (row) groups are formed, as a result of which one unit layer 25 is formed. This three-dimensional object production method indicates S19.

As above, in the three-dimensional object production apparatus 10*b*, in the case where the failed nozzle 23 in which the droplet ejection failure or missing nozzle is occurring exists, the deficiency and excess of the liquid amount of the droplets ejected from the failed nozzle 23 is compensated by adjusting the liquid amount of the droplets ejected from the proximate nozzle 24. Due to this, in the three-dimensional object production apparatus 10*b*, the unit layers 25 can more satisfactorily be formed even if the droplet ejection failure or missing nozzle occurs.

It should be noted that in the above, an embodiment for the case where the failed nozzle with the missing nozzle exists has been illustrated; however, the unit layers 25 can more satisfactorily be formed likewise in the case where the failed nozzle with the ejection failure exists. In the case where a failed nozzle with excessive ejection exists, of which liquid amount of the droplets ejected within the preset time period is greater than the predetermined range, the liquid amount of the droplets ejected from the proximate nozzle can be reduced according to the liquid amount of the droplets ejected from this failed nozzle. Further, in the case where a failed nozzle with deficient ejection exists, of which liquid amount of the droplets ejected within the preset time period is less than the predetermined range, the liquid amount of the droplets ejected from the proximate nozzle can be increased according to the liquid amount of the droplets ejected from this failed nozzle.

Similarly to the first embodiment, a configuration that completes one unit layer 25 by all the passes has been illustrated in the above; however, the disclosure is not necessarily limited to this. In a case where one unit layer is large, this unit layer may be divided into a plurality of sections, and the shaping may be performed in section units. In this case, the "unit layer 25" in the above description regarding S12 to S19 may be replaced with "one section of the unit layer", and the operations of S12 to S19 as above may be performed for each section of the unit layer. Due to this, one section of the unit layer is formed by all the passes, and one unit layer is completed by forming all the sections of the unit layer.

(Nozzle Inspection)

Hereinbelow, the nozzle inspection by the nozzle inspection unit 33 will be described in detail.

When a start of printing, which is a start of the shaping of the three-dimensional object is identified, the nozzle inspection controller 36 identifies the nozzles 21 to be used for forming the first unit layer. Further, the nozzle inspection controller 36 itself may create data indicating timings to use the respective nozzles 21 from the shaping data of the three-dimensional object, and may identify the nozzles 21 to be used for forming the first unit layer from this data. Alternatively, the data indicating timings to use the respective nozzles 21 may be created by hardware in which another printing software is installed, and this data may be acquired by the nozzle inspection controller 36 to identify the nozzles 21 to be used for forming the first unit layer based on this data.

It should be noted that when a user inputs a shaping instruction of the three-dimensional object to the three-dimensional object production apparatus 10b, the nozzle inspection controller 36 identifies the start of printing. In a case where the shaping instruction of the three-dimensional object from the user is a shaping instruction of a plurality of three-dimensional objects, each timing when the three-dimensional object to be shaped changes may be identified as the start of printing.

The nozzle inspection controller 36 controls the nozzle inspection unit 33 to perform the nozzle inspection of the nozzles 21 to be used for forming the first unit layer and the nozzles 21 in the same nozzle row 22 as the aforementioned nozzles 21. By controlling as above, the nozzles 21 that eject same type of droplets can efficiently be inspected even if a total ejection amount and a frequency of use differ greatly depending on the types of the droplets. It should be noted that in the three-dimensional object production apparatus 10b according to the disclosure, the nozzle inspection of the nozzles 21 does not have to be performed in every nozzle row 22, but only the nozzles 21 used for forming one unit layer may be inspected.

The nozzle inspection unit 33 performs the nozzle inspection of the nozzles 21 based on an instruction from the nozzle inspection controller 36. Specifically, the nozzle inspection unit 33 detects the liquid amount of the droplets ejected from each nozzle 21 within the preset time period based on the degree by which the light of the photosensor is interrupted.

The nozzle inspection unit 33 sends a detection result to the nozzle selecting unit 34. The nozzle selecting unit 34 identifies the nozzle of which liquid amount of the droplets ejected within the preset time period is outside the predetermined range as the failed nozzle based on the detection result of the nozzle inspection unit 33.

When the formation of the first unit layer is finished, the nozzle inspection controller 36 then identifies the nozzles 21 to be used for forming the second unit layer. Then, the nozzle inspection controller 36 controls the nozzle inspection unit 33 to perform the nozzle inspection of the nozzles 21 to be used for forming the second unit layer and the nozzles 21 included in the same nozzle row 22 as the aforementioned nozzles 21. The aforementioned series of operations are performed each time a unit layer is formed.

It should be noted that a control may be performed so that the nozzle inspection is performed for the nozzles 21 that are to eject the droplets for the first time after having started shaping the three-dimensional object before forming a unit layer using the droplets thereof. According to such a control, only the nozzles 21 that have not been used in forming the unit layers which have been formed prior to one unit layer but will be used for the first time in forming the one unit layer can be inspected, so that a number of the nozzles 21 on which the nozzle inspection is performed can be reduced. As a result, the duration of the nozzle inspection can be shortened, and time until forming the subsequent unit layer can be shortened.

(Additional Nozzle Inspection)

In the above, the nozzle inspection is performed each time a unit layer is formed by setting the nozzles 21 used in forming the unit layer and the nozzles 21 in the same nozzle row 22 as the aforementioned nozzles 21 as the inspection targets; however, the nozzle inspection described below may be performed together therewith.

The nozzle inspection controller 36 may control the nozzle inspection unit 33 to perform the nozzle inspection of the nozzles 21 which have not performed droplet ejection by a preset number of times, and the nozzles 21 which have not ejected the droplets for a preset liquid amount while forming a preset number of unit layers. According to such a control, even if the droplet ejection failure or missing nozzle is occurring in a nozzle 21 of which frequency of use is low, such an abnormality can be detected.

The "preset number of unit layers", the "preset number of times of the droplet ejection", and the "droplets for the preset liquid amount" may suitably be set based on thickening of the droplets or sizes of the unit layers, and they may be different depending on types of the droplets.

It should be noted that the nozzle inspection controller 36 may control the nozzle inspection unit 33 to perform the nozzle inspection of the nozzles 21 which have not performed the droplet ejection by the preset number of times, and the nozzles 21 which have not ejected the droplets for the preset liquid amount during a preset time period, instead of the period while forming the preset number of unit layers.

(Variant Example of Nozzle Inspection)

It should be noted that the nozzle inspection in the three-dimensional object production apparatus 10b according to the disclosure is not limited to the nozzle inspection performed each time a unit layer is formed that sets the nozzles 21 used in forming the unit layer and the nozzles 21 included in the same nozzle row 22 as those nozzles 21.

For example, the nozzle inspection of one nozzle row 22 may be performed every time a preset number of unit layers are formed. In a case of performing the nozzle inspection for all the nozzle rows 22 at a time, time will be required to perform the nozzle inspection, so that a standby time before a subsequent unit layer is formed on a surface of a unit layer that has been formed immediately before becomes long. Due to this, the state of the surface of the unit layer that has been formed immediately before comes to be in a different state regarding dryness and wettability thereof from those of the unit layers that had previously been formed, and thus, there is a possibility that a problem such as a lamination defect occurs.

Thus, by performing the nozzle inspection of one nozzle row 22 per one nozzle inspection, the time from when one unit layer is formed until the subsequent unit layer is formed can be shortened and equalized.

Alternatively, the nozzle inspection for one region in one nozzle row 22 may be performed every time a preset number of unit layers are formed. Further, the nozzle inspection of at least a preset part of the nozzles 21 may be performed per one nozzle inspection. Further, nozzles 21 (group thereof) with a low frequency of use may be selected in advance, and the nozzle inspection may be performed at a predetermined timing.

(Position Control of Nozzle Inspection Unit 33)

It should be noted that in the case where the print head 20 moves, the three-dimensional object production apparatus 10b preferably includes a position controlling unit that performs control so that a distance between the nozzle inspection unit 33 and the droplet ejection surface of the print head 20 stays within a preset range. Specifically, the position controlling unit that detects a position of the droplet ejection surface of the print head 20 in a vertical direction and a position of the nozzle inspection unit 33 in the vertical direction, and moves at least one of the print head 20 and the nozzle inspection unit 33 so that the distance therebetween stays within the preset range is preferably provided. Due to this, the distance from the ejection surface of the print head 20 to the region where the ejected droplets are detected by the nozzle inspection unit 33 can be maintained constant.

It should be noted that in a case where the position of the nozzle inspection unit 33 relative to the print head 20 is fixed, such as when the nozzle inspection unit 33 is mounted on the carriage 11, the position controlling unit as above does not need to be provided. This is because the position of the nozzle inspection unit 33 relative to the droplet ejection surface of the print head 20 is fixed, and the distance to the region where the droplets ejected from the ejection surface of the print head 20 are detected by the nozzle inspection unit 33 is maintained constant.

(Software-Implemented Example)

Each of the controllers 30 of the three-dimensional object production apparatuses 10a, 10b, especially the nozzle inspection unit 33, the nozzle selecting unit 34, the ejection controller 35, and the nozzle inspection controller 36 thereof may be implemented by logic circuits which are hardware formed on an integrated circuit (IC chip: Integrated Circuit), or may be implemented by software using a CPU (Central Processing Unit).

In the latter case, each of the three-dimensional object production apparatuses 10a, 10b is provided with the CPU that executes instructions of a program which is the software for implementing respective functions, a ROM (Read-Only Memory) or a storage device termed a recording medium on which the program and various types of data are recorded in computer or CPU-readable formats, and a RAM (Random Access Memory) for expanding the program. Further, the purpose of the disclosure is achieved by a computer or CPU reading the program from the recording medium and executing the same. As the recording medium, a "non-volatile and tangible medium", such as a tape, a disk, a card, a semiconductor memory, a programmable logic circuit, and the like may be used. Further, the program may be supplied to the computer through a voluntary transmission medium capable of transmitting the program, such as a communication network or a broadcast wave. It should be noted that the disclosure may be implemented alternatively in an embodiment of data signals embedded in carrier waves, in which the program is implemented by electronic transmission.

The disclosure is not limited to the foregoing embodiments, and various modifications may be made within the range indicated in the claims, and embodiments obtained by suitably combining the technical elements disclosed in different embodiments are also included in the technical range of the disclosure.

(Summary)

The three-dimensional object production method according to an embodiment of the disclosure is a three-dimensional object production method that shapes a three-dimensional object by laminating the unit layers 25 formed by ejecting droplets from the print head 20 which is a head, the head including a nozzle row 22 in which a plurality of nozzles 21 are aligned along a sub scanning direction which intersects perpendicularly to a main scanning direction of the head, the nozzle row 22 being divided into a predetermined number n (n being an integer $\geq 2$) of regions in the sub scanning direction, the method including: an allocating step of allocating one of the regions in the nozzle row 22 that is different from each other to each of pixel groups, each of which is configured of pixels divided into groups of the predetermined number n in pixel rows constituting one of the unit layers 25 and located at a predetermined interval in the main scanning direction; and a forming step of forming the pixel rows by the nozzles 21 in each of the regions forming one of the pixel groups.

According to the above method, one pixel group is formed by one pass is formed, and one unit layer 25 is completed by all the passes. Especially in the above method, the pixels located at the predetermined interval are formed by one pass. Due to this, the pixels formed by one nozzle 21 do not align sequentially in the main scanning direction, and are dispersed in the main scanning direction. Due to this, even if droplet ejection failure or missing nozzle occurs, a groove can be prevented from being formed in the unit layer 25 in the main scanning direction due to the pixels formed by the nozzle 21 in which the droplet ejection failure or missing nozzle is occurring being aligned sequentially in the main scanning direction. As above, in the three-dimensional object production method according to an embodiment of the disclosure, the unit layers 25 can satisfactorily be formed even if the droplet ejection failure or missing nozzle occurs.

Here, in normal multi-pass printing, shaping time is doubled if a pass number is doubled. However, in the three-dimensional object production method according to the embodiment of the disclosure, since one pixel group is formed at equal intervals by one pass and one unit layer 25 is completed by using all the passes, a scan resolution of the head can be reduced, so that a scan speed per one pass becomes faster as compared to the normal multi-pass printing. Thus, in the three-dimensional object production method according to the embodiment of the disclosure, since the scan speed per one pass is doubled even when the pass number is doubled, its shaping time can be made equal to a shaping time for a case of forming the unit layers 25 in a single pass.

Further, in the three-dimensional object production method according to an embodiment of the disclosure, the forming step may include: a first forming step in which the nozzles 21 in one region A form a first pixel group; and a step in which the nozzles 21 in the region B, which is located downstream of the one region A in the sub scanning direction and is adjacent to the one region, form a second pixel group being different from the first pixel group after the first forming step.

According to the above method, ejection control of droplets in one region is performed and when one scan by the head is finished, a region for ejecting droplets is switched to a next region to perform ejection control therefor. As above, according to the above method, multi-pass printing which forms one unit layer 25 by ejecting droplets from nozzles 21 included in one region by one pass, and then ejecting droplets from nozzles 21 included in a subsequent region in a subsequent pass can be performed.

In the three-dimensional object production method according to the embodiment of the disclosure, in the allocating step, the region of the nozzle row 22 to be allocated to each of at least two pixels that are adjacent in the laminating direction along which the unit layers 25 are laminated may be different from each other.

According to the above method, the pixels formed by one nozzle 21 will not be arranged sequentially in the laminating direction as well, and are dispersed in the laminating direction as well. Due to this, even if the droplet ejection failure or missing nozzle occurs, a groove can be prevented from being formed in the three-dimensional object in the laminating direction due to the pixels formed by the nozzle 21 in which the droplet ejection failure or missing nozzle is occurring being arranged sequentially in the laminating direction.

The three-dimensional object production method according to the embodiment of the disclosure may further include: a detecting step of detecting a liquid amount of the droplets ejected from each of the nozzles 21; a first identifying step of identifying a failed nozzle 23, of which liquid amount of the ejected droplets within a preset time period is outside a predetermined range, from among the plurality of nozzles 21 based on a detection result of the detecting step; a second identifying step of identifying a proximate nozzle 24 that forms a pixel closest in the main scanning direction to a pixel formed by the failed nozzle 23; and an adjusting step of adjusting the liquid amount of the droplets ejected from the proximate nozzle 24 in accordance with the liquid amount of the droplets ejected from the failed nozzle 23.

According to the above method, in the case where the failed nozzle 23 in which the droplet ejection failure or missing nozzle is occurring exists, the liquid amount of the droplets ejected from the proximate nozzle 24 is adjusted to compensate the deficiency and excess of the liquid amount of the droplets ejected from the failed nozzle 23. Due to this, in the above method, even if the droplet ejection failure or missing nozzle occurs, the unit layers 25 can more suitably be formed.

In the three-dimensional object production method according to the embodiment of the disclosure, in the adjusting step, in the case where the liquid amount of the droplets ejected from the failed nozzle 23 within the preset time period is greater than the predetermined range, the liquid amount of the droplets ejected from the proximate nozzle 24 may be reduced in accordance with the liquid amount of the droplets ejected from the failed nozzle 23, and in the case where the liquid amount of the droplets ejected from the failed nozzle 23 within the preset time period is less than the predetermined range, the liquid amount of the droplets ejected from the proximate nozzle 24 may be increased in accordance with the liquid amount of the droplets ejected from the failed nozzle 23.

According to the above method, in the case where a failed nozzle 23 with excessive ejection exists, the liquid amount of the droplets ejected from the proximate nozzle 24 is reduced in accordance with the liquid amount of the droplets ejected from the failed nozzle 23. Further, in the case where a failed nozzle 23 with deficient ejection exists, the liquid amount of the droplets ejected from the proximate nozzle 24 is increased in accordance with the liquid amount of the droplets ejected from the failed nozzle 23. As above, the deficiency and excess of the liquid amount of the droplets ejected from the failed nozzle 23 can be compensated by adjusting the liquid amount of the droplets ejected from the proximate nozzle 24.

Production apparatuses of a three-dimensional object according to embodiments of the disclosure are the three-dimensional object production apparatuses 10a, 10b, each of which shapes a three-dimensional object by laminating the unit layers 25 formed by ejecting droplets from the print head 20 which is a head, the head including a nozzle row 22 in which a plurality of nozzles 21 are aligned along a sub scanning direction which intersects perpendicularly to a main scanning direction of the head, the nozzle row 22 being divided into a predetermined number n (n being an integer ≥2) of regions in the sub scanning direction, each apparatus including the ejection controller 35 being an allocating unit that allocates one of the regions in the nozzle row 22 that is different from each other to each of pixel groups, each of which is configured of pixels divided into groups of the predetermined number n in pixel rows constituting one of the unit layers 25 and located at a predetermined interval in the main scanning direction, wherein the nozzles 21 in each of the regions form the pixel rows by forming one of the pixel groups.

According to the above configuration, same effect as that of the three-dimensional object production method according to an embodiment of the disclosure can be achieved.

INDUSTRIAL APPLICABILITY

The disclosure can be used in shaping of a three-dimensional object.

The invention claimed is:

1. A three-dimensional object production method that shapes a three-dimensional object by laminating unit layers formed by ejecting droplets from a head,
the head including a nozzle row in which a plurality of nozzles are aligned along a sub scanning direction which intersects perpendicularly to a main scanning direction of the head, the nozzle row being divided into a predetermined number n (n being an integer ≥2) of regions in the sub scanning direction,
the three-dimensional object production method comprising:
an allocating step of allocating one of the regions in the nozzle row that is different from each other to each of pixel groups, each of which is configured of pixels divided into groups of the predetermined number n in pixel rows constituting one of the unit layers and located at a predetermined interval in the main scanning direction, so that the regions in the same nozzle row are not adjacent to each other in the main scanning direction; and
a forming step of forming the pixel rows by the nozzles in each of the regions forming one of the pixel groups, wherein
in the allocating step, the regions of the nozzle row to be allocated respectively to at least two of the pixels that are adjacent in a laminating direction along which the unit layers are laminated are different from each other.

2. The three-dimensional object production method according to claim 1, wherein the forming step comprises:
- a first forming step in which the nozzles in one of the regions form a first pixel row group; and
- a step in which the nozzles in another region, which is located downstream of the one region in the sub scanning direction and is adjacent to the one region, form a second pixel group being different from the first pixel group after the first forming step.

3. The three-dimensional object production method according to claim 1, further comprising:
- a detecting step of detecting a liquid amount of the droplets ejected from each of the nozzles;
- a first identifying step of identifying a failed nozzle, of which liquid amount of the droplets ejected within a preset time period is outside a predetermined range, from among the plurality of nozzles based on a detection result of the detecting step;
- a second identifying step of identifying a proximate nozzle that forms a pixel closest in the main scanning direction to a pixel formed by the failed nozzle; and
- an adjusting step of adjusting the liquid amount of the droplets ejected from the proximate nozzle in accordance with the liquid amount of the droplets ejected from the failed nozzle.

4. The three-dimensional object production method according to claim 3, wherein in the adjusting step:
- in a case where the liquid amount of the droplets ejected from the failed nozzle within the preset time period is greater than the predetermined range, the liquid amount of the droplets ejected from the proximate nozzle is reduced in accordance with the liquid amount of the droplets ejected from the failed nozzle, and
- in a case where the liquid amount of the droplets ejected from the failed nozzle within the preset time period is less than the predetermined range, the liquid amount of the droplets ejected from the proximate nozzle is increased in accordance with the liquid amount of the droplets ejected from the failed nozzle.

* * * * *